(No Model.)
E. R. ANNABLE.
WHIFFLETREE.
No. 297,960. Patented May 6, 1884.
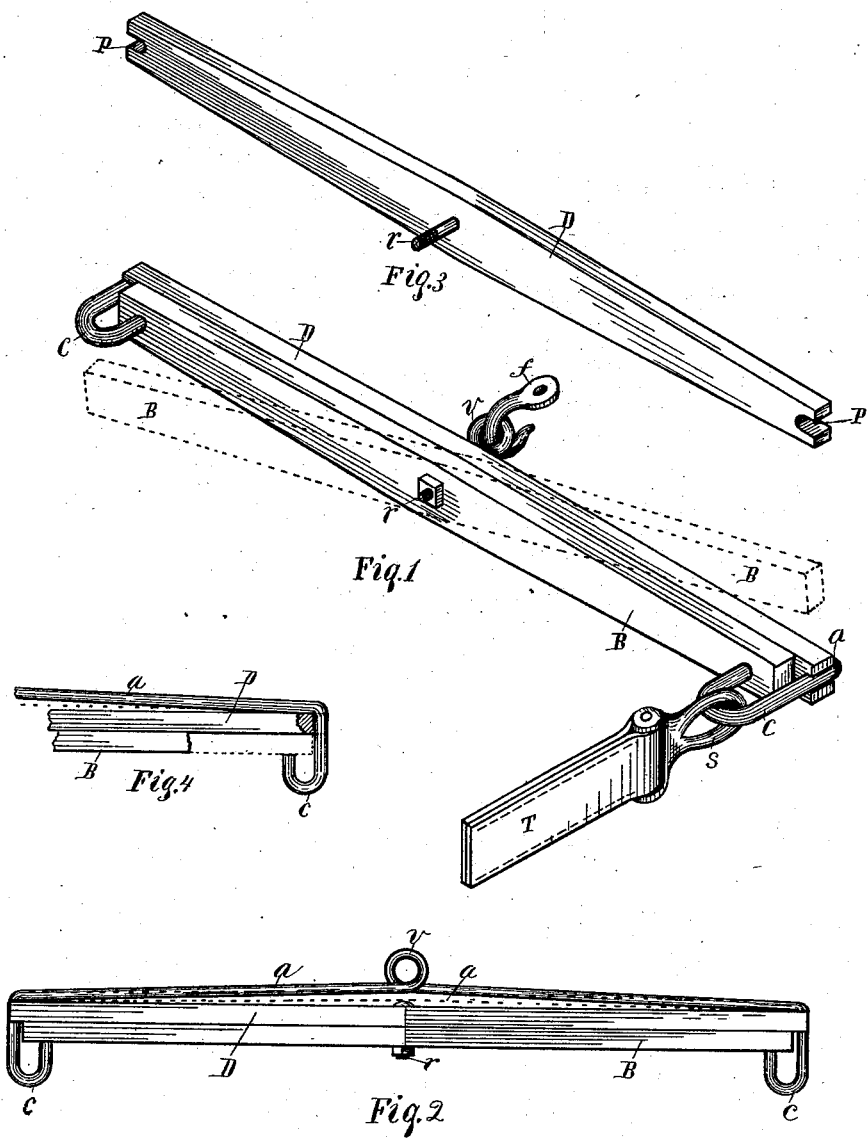

United States Patent Office.

EDWARD R. ANNABLE, OF PAW PAW, MICHIGAN.

WHIFFLETREE.

SPECIFICATION forming part of Letters Patent No. 297,960, dated May 6, 1884.

Application filed February 26, 1884. (No model.)

*To all whom it may concern:*

Be it known that I, EDWARD R. ANNABLE, a citizen of the United States, residing at Paw Paw, county of Van Buren, State of Michigan, have invented a new and useful Whiffletree, of which the following is a specification.

My invention has for its object to construct a simple and cheap device provided with improved means for locking the trace-eyes in the whiffletree-hooks.

In the drawings forming a part of this specification, Figure 1 is a front perspective view of the whiffletree with a broken trace connected with one hook; Fig. 2, a top plan view; Fig. 3, a perspective view of a detached part of Fig. 1, and Fig. 4 is a broken end view of Fig. 2.

The whiffletree consists of a draw-bar, a a, provided with a central loop, v, for connecting with the burden to be drawn, and a hook, c, at each end, with which the eye S of the trace T is connected when in use, as in Fig. 1. A spreader or brace, D, is located between the hooks c c, and is provided with slots P P, adapted to receive the angled ends of the draw-bar a, as shown in Figs. 1, 3, and 4. The brace D is provided with a pivot, r, threaded at the end extending forward and headed at the other. A lock-bar, B, is pivotally located on the pivot r, and is adapted to swing between the angled ends of the draw-bar which terminate in the hooks c, and to enter the space between the end of the hooks and the spreader D, Figs. 2 and 4. A nut is screwed on the threaded end of the pivot r, to hold the lock-bar B on said pivot and to fix such tension thereon as may be necessary according to the wear and shrinkage of parts.

A device made of such simple parts can be cheaply produced, easily operated, and is not liable to get out of order. It will be found to be of especial utility when cultivating corn and the like, where the traces are so liable to unhook when turning about at the end of the row. The bar a springs back from the dotted position shown in Fig. 2 when in use, causing the end of the hooks c to press hard against the ends of the lock-bar B, which action effectually holds said bar from swinging out of place.

In Fig. 1 the dotted position of the lock-bar B shows its position when hooking the traces, and the full bar B in said figure shows the trace-eyes S locked in the hook c by the ends of said bar, as above described.

Having thus described my invention, what I claim as new, and desire to secure by Letters Patent, is—

1. A whiffletree consisting of a draw-bar provided with the end hooks, a spreader between said hooks, and a pivotally-connected lock-bar adapted to enter and fill the spaces between the ends of the hooks and the spreader, substantially as set forth.

2. The elastic draw-bar provided with the central loop and end hooks, in combination with a spreader between said hooks, and a lock-bar pivotally connected with said spreader, and adapted to operate substantially as set forth.

3. The combination, with the draw-bar having the end hooks, of the spreader provided with the central pivot and end notches, and a lock-bar adapted to operate as set forth, substantially as specified.

In testimony of the foregoing I have hereunto subscribed my name in the presence of two witnesses.

EDWARD R. ANNABLE.

Witnesses:
JOHN WILLIAMS,
CHARLES V. CHASE.